United States Patent [19]
Giacoletti et al.

[11] 3,968,896
[45] July 13, 1976

[54] FUEL TANK

[75] Inventors: John B. Giacoletti, Utica; Thomas C. Ryding, Madison Heights; Walter C. Zetye, Orchard Lake, all of Mich.

[73] Assignee: General Motors Corporation, Detroit, Mich.

[22] Filed: June 20, 1975

[21] Appl. No.: 588,887

[52] U.S. Cl. ............................. 220/63 R; 73/306; 73/317; 220/85 R; 220/85 B
[51] Int. Cl.² ................... B65D 25/14; B65D 25/02
[58] Field of Search ............ 73/305, 306, 314, 317, 73/318, 322, 322.5; 220/22, 63 R, 85 R, 85 B

[56] References Cited
UNITED STATES PATENTS

| | | | |
|---|---|---|---|
| 2,326,263 | 4/1943 | Steiner | 220/63 R |
| 2,366,442 | 1/1945 | Cunningham | 285/200 |
| 2,370,799 | 3/1945 | Kelly | 285/200 |
| 3,129,014 | 4/1964 | Hutchinson | 280/5 |
| 3,178,330 | 4/1965 | Reddick | 156/253 |
| 3,426,937 | 2/1969 | Boschi | 220/63 R |

*Primary Examiner*—George E. Lowrance
*Attorney, Agent, or Firm*—C. K. Veenstra

[57] ABSTRACT

A vehicle fuel tank has a flexible bladder disposed within a metal shell. A vent line extending from within the bladder is controlled by an altitude sensitive valve, and a pressure balance line interconnects the vent line and the space between the shell and the bladder to minimize any pressure differential across the bladder. The bladder contains a fuel level sensor having a float which moves an arm through a vertical path. A fender is suspended within the bladder and is contoured to follow the path of the sensor arm to preclude interference between the bladder and the arm.

4 Claims, 6 Drawing Figures

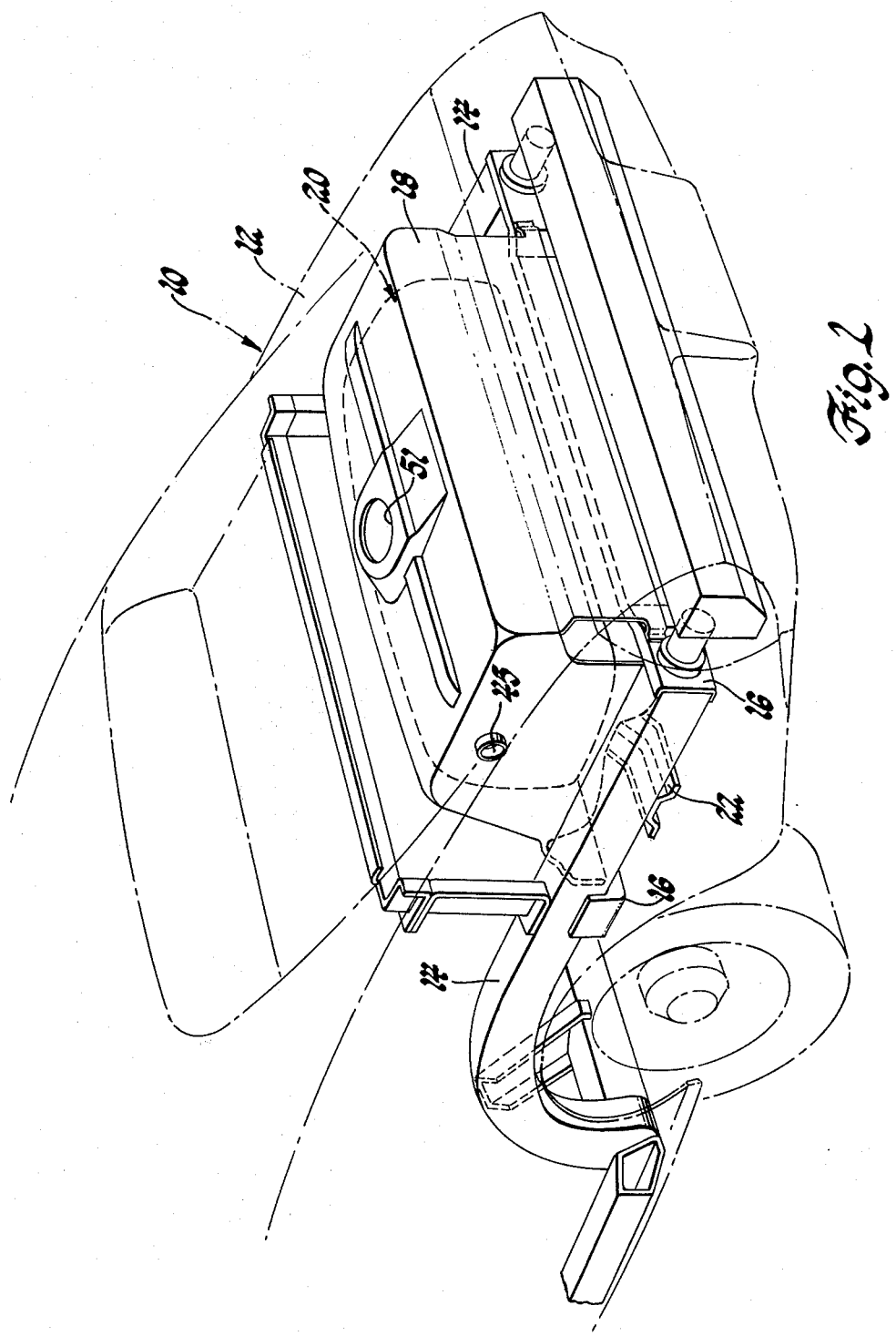

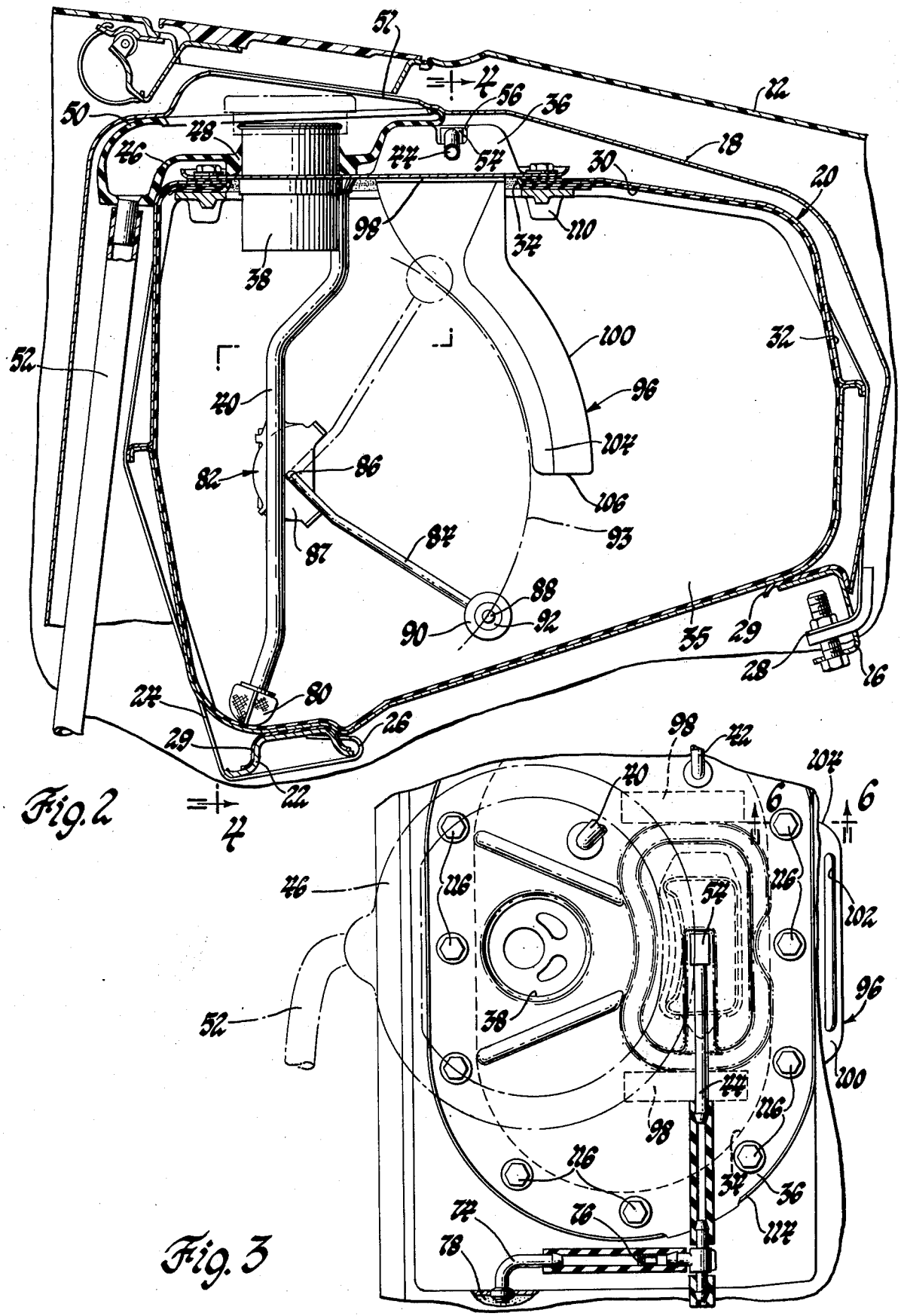

FUEL TANK

This invention relates to vehicle fuel tanks and, more particularly, to a fuel tank having a flexible bladder.

There have been numerous proposals for vehicle fuel tanks in which a flexible bladder contains the fuel and is disposed within a protective metal shell. In general, however, such proposals have not encompassed protection against abnormal circumstances which might tend to cause collapse of the bladder within the shell.

This invention provides a fuel tank comprising a flexible bladder containing a fuel level sensor and a fender suspended adjacent the sensor to preclude interference between the bladder and the sensor should the bladder collapse.

The details as well as other objects and advantages of this invention are set forth in the remainder of the specification and are shown in the drawings in which:

FIG. 1 is an environmental view of a fuel tank constructed according to this invention as it may be mounted within a vehicle;

FIG. 2 is a longitudinal sectional view of the FIG. 1 fuel tank illustrating the fuel level sensor, the fender, and other features of the tank;

FIG. 3 is a top plan view of a portion of the FIG. 1 tank further illustrating the fender and other features of the tank;

Figure 4:
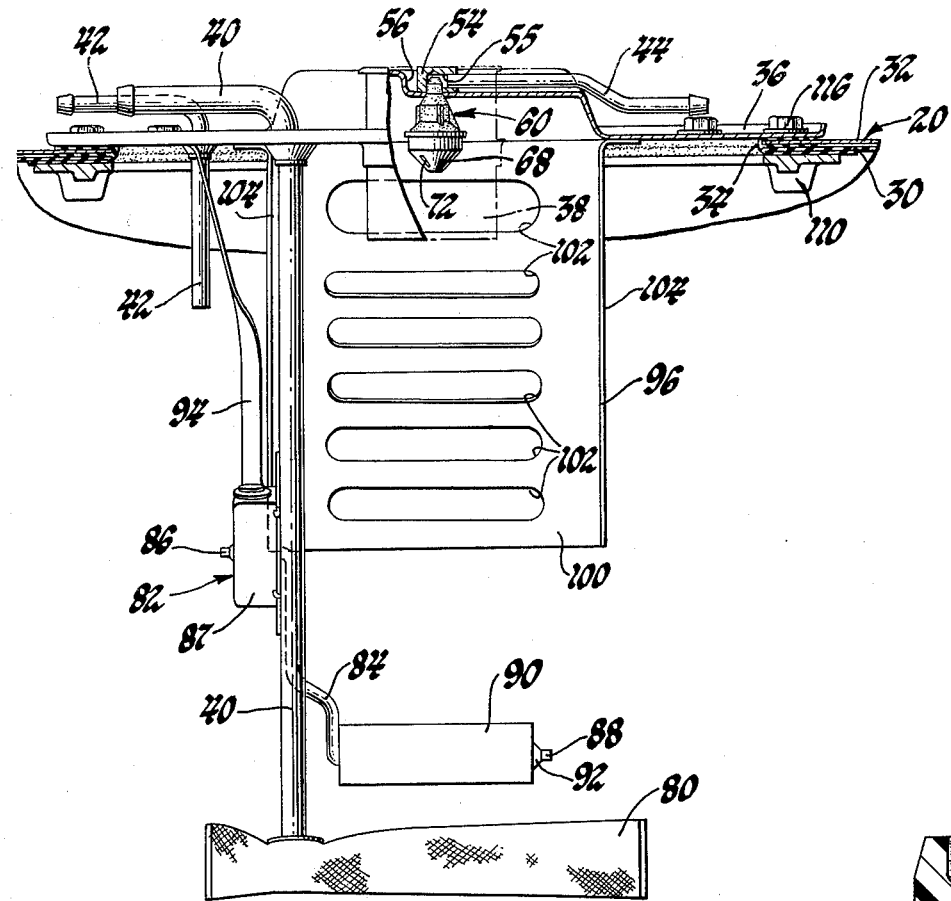
FIG. 4 is a sectional view taken along line 4—4 of FIG. 2 additionally illustrating the fuel level sensor and the fender and other features of the tank.

Referring first to FIG. 1, an automobile 10 has a body 12 mounted on a pair of longitudinal frame members 14 interconnected by transverse frame members 16. A metal cover 18 is mounted upon frame members 14 and 16 within body 12 and encloses a fuel tank 20.

As shown in FIG. 2, fuel tank 20 is supported on the rear frame member 16 and on a cross member 22 and is secured thereto by a pair of straps 24 hooked at one end 26 into cross member 22 and bolted at the other end 28 to rear member 16. Antisqueak pads 29 are disposed between tank 20 and members 16 and 22.

Tank 20 includes a flexible bladder 30 disposed within a rigid shell 32. An aperture 34 in the top of fuel tank 20 provides access through shell 32 and bladder 30 to the interior 35 of the tank and is covered by a rigid closure plate 36. As shown in FIGS. 2, 3 and 4, closure plate 36 carries a filler neck 38 through which fuel is delivered to the tank, a fuel line 40 through which fuel is delivered from the tank, a return line 42 through which fuel vapor entrained in liquid fuel is returned to the tank, and a vent line 44 through which fuel vapor is discharged from and air is admitted to the tank. Access openings 45 at each end of cover 18 permit fuel line 40, return line 42, and vent line 44 to extend to the engine compartment.

A boot 46 with its inner periphery 48 fitting snugly around filler neck 38 and its outer rim 50 biased against cover 18 about the access opening 51 therein, collects any fuel which may be spilled from filler neck 38. A drain line 52 extends downwardly from boot 46 to discharge any fuel which may be collected.

Figure 5:
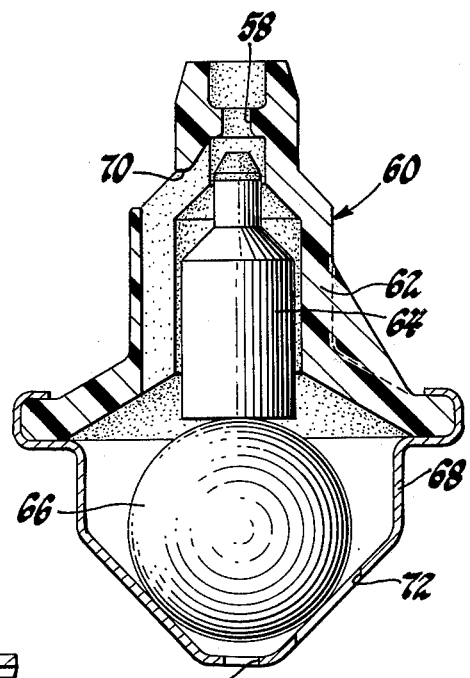
FIG. 5 is an enlarged sectional view of a tank vent control valve.

Vent line 44 extends from a block 54 which is received in a recess 56 formed in the top of closure plate 36. Block 54 has an internal passage 55 which communicates with the interior 35 of tank 20 through a restricted opening 58 formed in a vent control valve assembly 60. As shown in FIG. 5, valve assembly 60 has a hollow body 62 which guides a valve member 64 contained therein. Valve member 64 is operated by a weighted ball 66 which is retained in a cup 68 secured to the lower end of body 62. A plurality of apertures 70 in body 62, together with a drain hole 71 and a plurality of apertures 72 in cup 68, permit vapor flow from the interior 35 of tank 20 through restricted opening 58 to vent line 44 and permit air flow from vent line 44 through restricted opening 58 into tank 20. However, should tank 20 be inverted, ball 66 will force valve member 64 to engage and close restricted openings 58, thus obstructing flow of liquid fuel into vent line 44.

It will be appreciated that valve assembly 60 may not be required in some applications and thus may be replaced by an upwardly concave sheet metal stamping secured to the underside of closure plate 36 and providing limited access to passge 55 through a bottom drain hole and a few small peripherally spaced holes.

As shown in FIG. 3, a pressure balance line 74, containing a restrictor 76, interconnects vent line 44 and the space 78 between bladder 30 and shell 32. Pressure balance line 74 assures that the pressure outside of bladder 30 follows the pressure inside bladder 30 to minimize the possibility that bladder 30 might collapse within shell 32.

Fuel line 40 extends to the bottom of tank 20 and receives fuel through a strainer 80. A conventional fuel level sensor assembly 82 is supported on fuel line 40 and has a rearwardly extending arm 84. One end 86 of arm 84 is pivotally mounted in a housing 87 and constrains arm 84 to movement within a vertical plane. The transversely extending free end 88 of arm 84 is encompassed by a cylindrical float 90 which is retained by a clip 92. Float 90 rides at or near the surface of the fuel contained within tank 20 and moves the free end 88 of arm 84 through a vertical arcuate path 93. The pivoted end 86 of arm 84 actuates an electrical contact within housing 87 to provide an electrical signal indicative of the fuel level; the signal is transmitted to a fuel level gauge through a conductor 94 and appropriate wiring (not shown) which may extend through cover access openings 45 to the instrument panel.

A fender 96 is suspended within tank 20 by a pair of flanges 98 which are welded to closure plate 36 as shown in FIG. 3. Fender 96 has a rear wall 100 depending adjacent and contoured to follow the curvature of path 93. As shown in FIG. 4, a plurality of transversely extending, vertically spaced, elongated slots 102 allow fuel to pass through fender 96 and thus minimize the hydraulic effects created by fender 96 which might otherwise affect float 90. Rear wall 100 extends transversely at least coterminously with end 88 of arm 84 and float 90, and a pair of side walls 104 extend forwardly from rear wall 100 to at least partially overlap the free end 88 of arm 84 and the ends of float 90.

As shown in FIGS. 2 and 4, the lower edge 106 of fender 96 is disposed at approximately the same height as the pivoted end 86 of arm 84.

Bladder 30, while being considered flexible, has sufficient rigidity to remain in contact with shell 32 under normal circumstances. However, certain abnormal circumstances may create a tendency for bladder 30 to collapse within shell 32. Yet even under such abnormal circumstances, the fuel in tank 20 will maintain at least the lower portion of bladder 30 in contact with the lower portion of shell 32. Thus even under abnormal circumstances, only the upper portion of bladder 30 would tend to separate from shell 32.

In the event the upper portion of bladder 30 were to collapse away from shell 32, fender 96 would hold it away from arm 84 and float 90. Fender 96 thus precludes interference between bladder 30 and arm 84 of fuel level sensor assembly 82.

Figure 6:
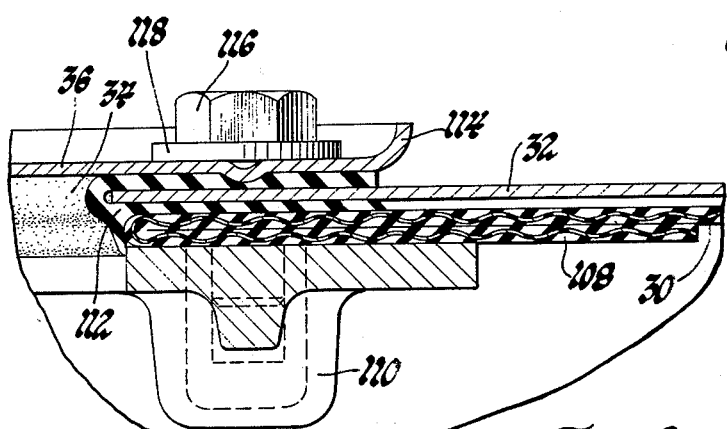
FIG. 6 is an enlarged sectional view, taken along line 6—6 of FIG. 3, showing the interconnection of the bladder, the metal shell, and a closure plate.

FIG. 6 illustrates the interconnection of bladder 30, shell 32 and closure plate 36. It may be noted that bladder 30 has a double thickness 108 which is vulcanized to a die-cast oval collar 110. A gasket 112, also vulcanized to bladder 30 and collar 110, extends back over the top of shell 32. Closure plate 36 has a rim 114 carrying a plurality of bolts 116 which extend through rim 114, gasket 112, shell 32, and the double thickness 108 of bladder 30 and are received in collar 110. Conical washers 118 are disposed between closure plate rim 114 and the heads of bolts 116 and compress O-rings (not shown) against closure plate rim 114.

The embodiments of the invention in which an exclusive property or privilege is claimed are defined as follows:

1. A fuel tank comprising an enclosure having a flexible wall and a rigid wall and adapted to contain liquid fuel, a fuel level sensor disposed within said enclosure and including a pivotally mounted arm having an end free for movement along an arcuate path in a selected plane and further including a float secured to said free end and responsive to the level of fuel within said enclosure for positioning said end of said arm along said path, means responsive to the position of said end of said arm for indicating the fuel level in said enclosure, and a fender having a flange secured to said rigid wall and a contoured portion disposed in said plane adjacent said arcuate path to prevent interference between said flexible wall and said arm should said flexible wall collapse.

2. A fuel tank comprising an enclosure adapted to contain liquid fuel and having a rigid upper wall portion, a flexible upper wall portion, and flexible side and lower wall portions, a fuel level sensor suspended from said rigid wall portion within said enclosure and including a pivotally mounted, longitudinally extending arm having a transversely extending end free for movement along a vertical arcuate path and further including a float secured on said free end and responsive to the level of fuel within said enclosure for positioning said end of said arm along said path, means responsive to the position of said end of said arm for indicating the fuel level in said enclosure, and a fender having a flange secured to said rigid wall portion and a contoured portion depending therefrom adjacent said arcuate path, said contoured portion extending transversely at least coterminously with said end of said arm and said float to prevent interference between said flexible wall portions and said sensor arm and float should any of said flexible wall portions collapse.

3. A fuel tank comprising an enclosure adapted to contain liquid fuel and having a rigid upper wall portion, a flexible upper wall portion, and flexible side and lower wall portions, a fuel level sensor suspended from said rigid wall portion within said enclosure and including a pivotally mounted, longitudinally extending arm having a transversely extending end free for movement along a vertical arcuate path and further including a float secured on said free end and responsive to the level of fuel within said enclosure for positioning said end of said arm along said path, means responsive to the position of said end of said arm for indicating the fuel level in said enclosure, and a fender having a flange secured to said rigid wall portion and a contoured wall depending therefrom adjacent said arcuate path, said contoured wall extending transversely at least coterminously with said end of said arm and said float to prevent interference between said flexible wall portions and said sensor arm and float should any of said flexible wall portions collapse, said contoured wall having a plurality of vertically spaced, transversely extending slots permitting fuel flow therethrough to minimize hydraulic effects created by said fender which might affect said sensor.

4. A fuel tank comprising a metal shell forming upper, lower and side walls, said upper wall having an aperture formed therein, a flexible bladder disposed within and substantially conforming to the shape of said shell to define an enclosure adapted to contain liquid fuel, said bladder having an aperture aligned with said aperture in said shell and a stiff collar formed thereabout, a rigid closure member overlying said apertures in said shell and said bladder, means securing said closure member to said shell and said collar, a filler neck extending through said closure member into said enclosure for supplying fuel thereto, a fuel line extending through said closure member from said enclosure for delivering fuel therefrom, a vent line extending through said closure member from said enclosure for delivering air thereto and fuel vapor therefrom, a pressure balance line opening to said vent line from the space defined between said shell and said bladder for minimizing the difference between the pressure in said enclosure and the pressure in said space, a fuel level sensor including a rearwardly extending arm pivotally mounted on said fuel line, said arm having a transversely extending end free for movement along a vertical arcuate path, a float secured about said end of said arm and responsive to the level of fuel within said enclosure for positioning said end of said arm along said path, means responsive to the position of said end of said arm for indicating the fuel level in said enclosure, and a fender having a flange secured to said rigid wall portion, a contoured wall depending from said rigid wall adjacent said arcuate path and extending transversely beyond said end of said arm and said float, and a pair of lateral walls extending forwardly adjacent said end of said arm and said float, said fender preventing interference between said bladder and said sensor arm and float should said bladder collapse, said contoured wall having a plurality of vertically spaced, transversely extending slots formed therethrough to minimize hydraulic effects created by said fender which might affect said sensor.

* * * * *